March 18, 1930.  J. EIFEL  1,751,270
DISPLAY APPARATUS
Filed Jan. 17, 1924   3 Sheets-Sheet 1
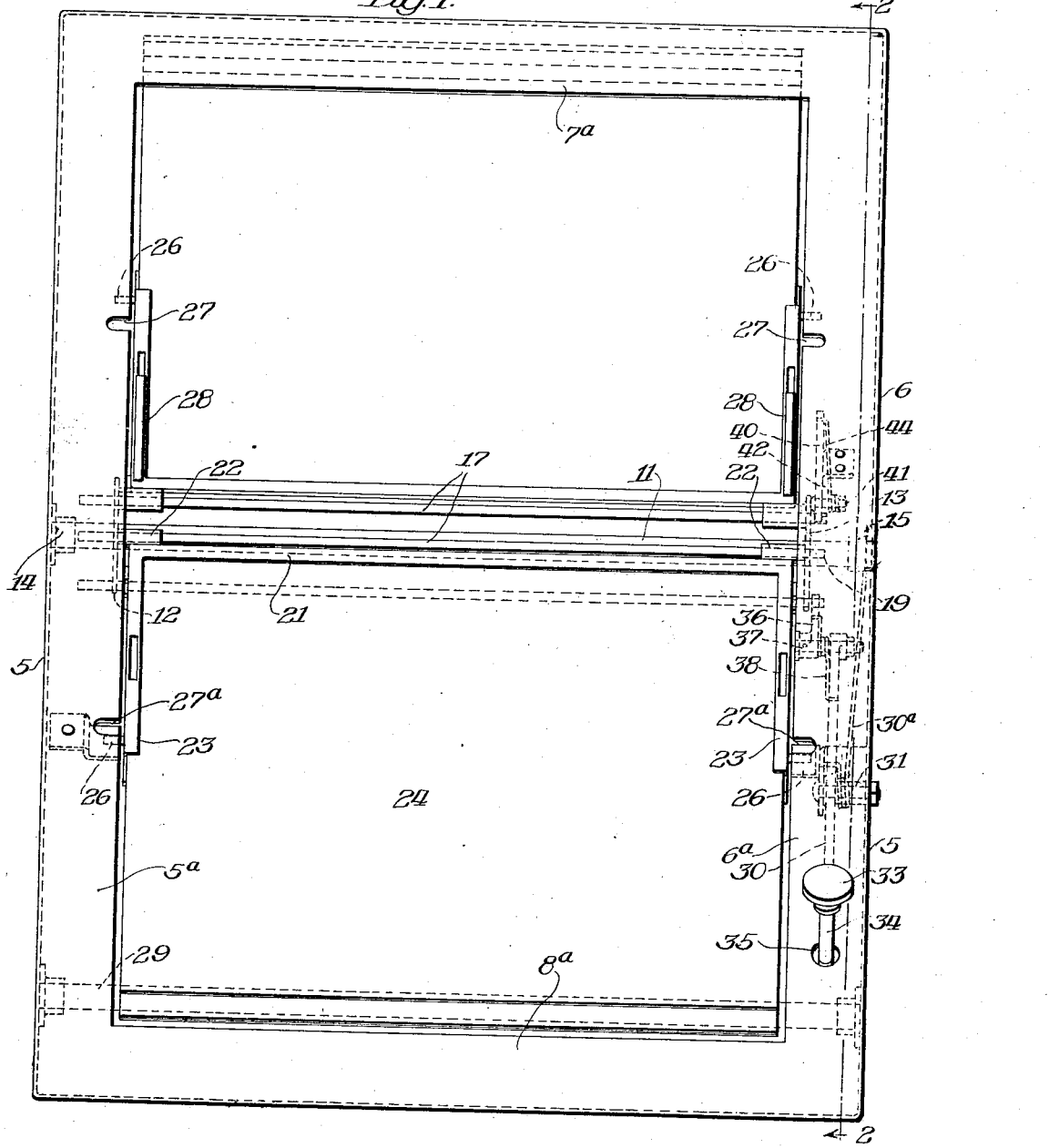

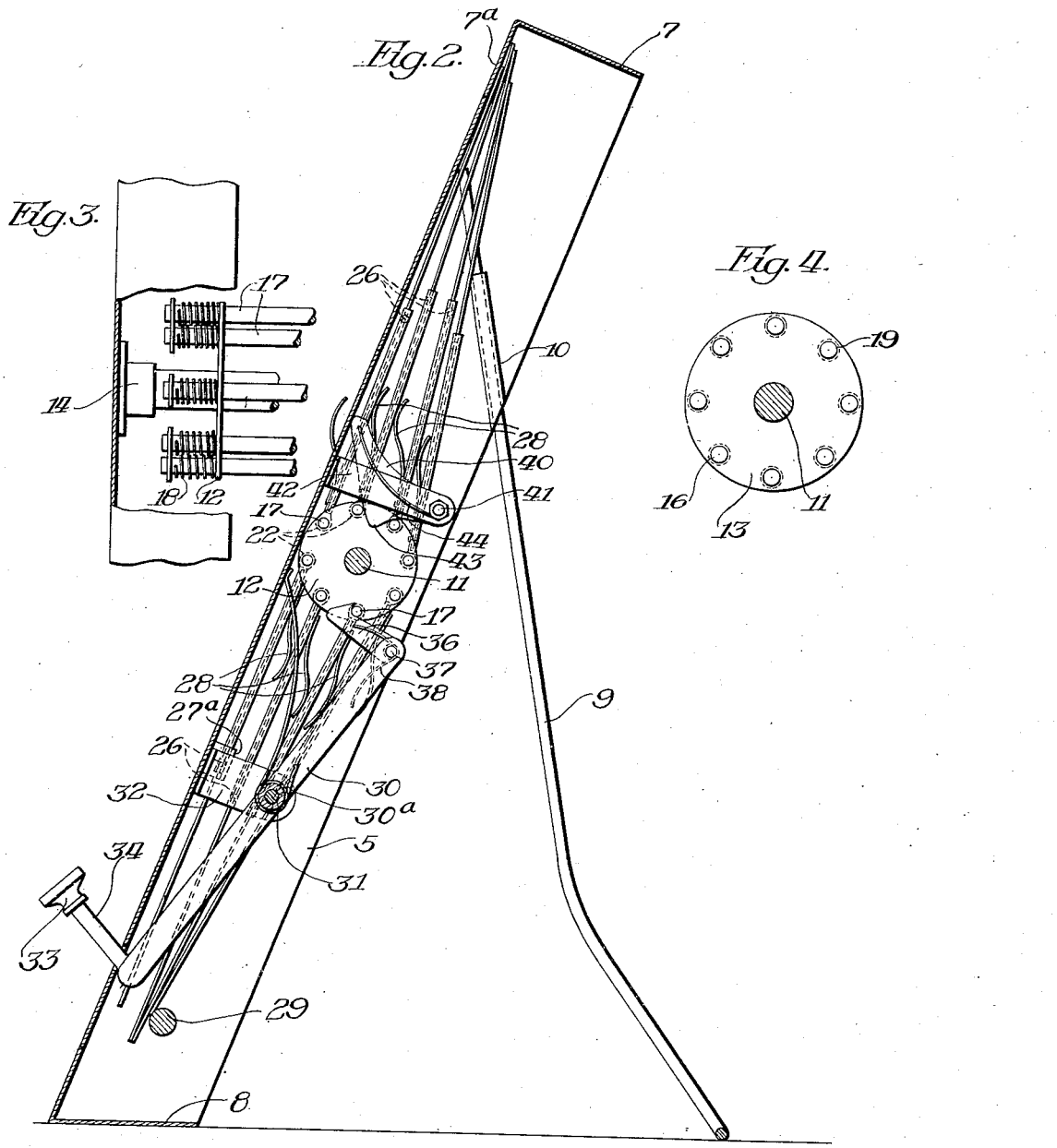

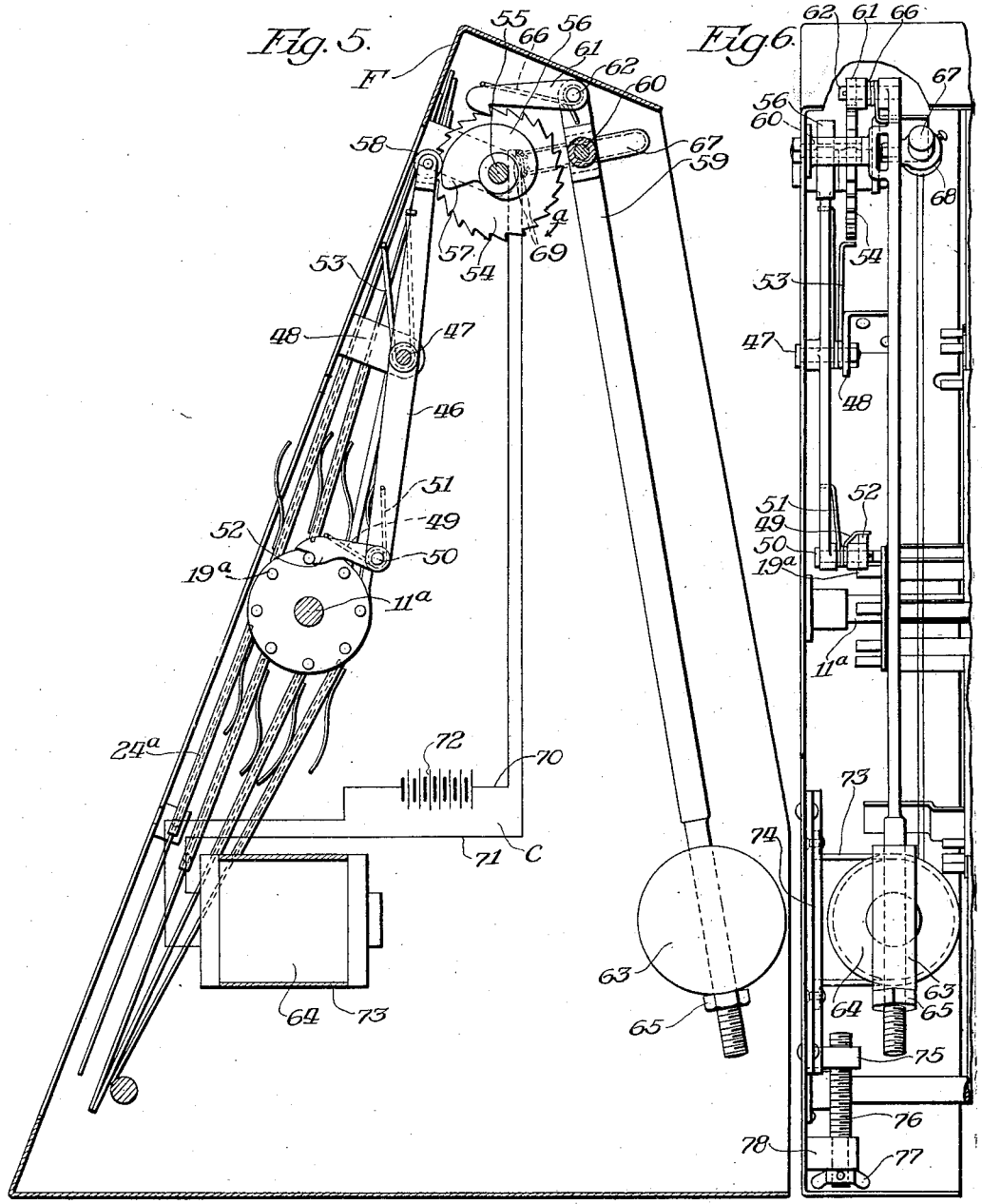

Patented Mar. 18, 1930

1,751,270

UNITED STATES PATENT OFFICE

JOSEPH EIFEL, OF CHICAGO, ILLINOIS

DISPLAY APPARATUS

Application filed January 17, 1924. Serial No. 686,855.

This invention relates broadly to display apparatus, more particularly to improvements in such devices as changeable exhibitors generally employed for advertising purposes, and more especially to improvements in such devices wherein a series of display members may be brought consecutively into view in pairs if desired.

While for the purposes of illustration, this invention is disclosed here as embodying a structure particularly adapted for use as an advertising device and including apparatus for displaying readily removable cards or plates in pairs, and in which both sides of each display member are brought into view, it will be understood that the device may be adapted to other purposes and that it finds a wide field of utility for purposes other than those disclosed here.

The principal objects and advantages which characterize this invention reside in the provision of an improved display apparatus; the provision of an improved display apparatus including means for bringing a plurality of display members into view; the provision of an improved display apparatus including means for bringing a plurality of display members into view in pairs; the provision of an improved display apparatus including means for bringing the opposite surfaces of a plurality of display members into view; the provision of an improved display apparatus including means for bringing the opposite surfaces of a plurality of display members into view in pairs; the provision of an improved display apparatus including means for bringing a plurality of display members consecutively into view; the provision of an improved display apparatus including means for bringing a plurality of display members consecutively into view in pairs; the provision of an improved display apparatus including improved means for consecutively bringing the opposite surfaces of a plurality of display members into view; the provision of an improved display apparatus including improved means for bringing the opposite surfaces of a plurality of display members into view consecutively in pairs; the provision of an improved display apparatus including a plurality of angularly displaceable display members and improved means for angularly displacing said members for bringing them into view in succession; the provision of an improved display apparatus including a plurality of angularly displaceable display members and improved spring pressed means for angularly displacing said members to bring them into view consecutively; the provision of an improved display apparatus including a plurality of angularly displaceable display members and improved spring pressed means for actuating said members, in combination with improved means for setting said spring pressed means; the provision of improved display apparatus including display members and improved spring pressed means for bringing said members into view, in combination with means for placing said spring means under tension; the provision of improved display apparatus including display members and improved spring pressed means for bringing said members into view, in combination with automatic means for intermittently placing said spring means under tension to bring the display members consecutively into view; and the provision of improved display apparatus of the character described which is simple in construction and efficient in operation.

This invention is further characterized by the provision of an improved display apparatus including readily removable display members which may be removed as a unit or bodily from the apparatus or which may be removed individually as desired or found necessary; the provision of an improved display apparatus including angularly displaceable display members in combination with means which is electrically operated for bringing said display members into view; the provision in combination with a plurality of improved display members, of improved electrically operated means which includes time controlled mechanism for bringing said display members consecutively into view in pairs and for displaying both sides of each display member; the provision, in combination with improved display members, of electrically operated means including an oscillating member for bringing said members consecutively into view; the provision, in combination with a plurality of display members, of means for bringing said members into view including a pendulum; and the provision, in combination with a plurality of display members, of means for bringing said members consecutively into view including a pendulum and electrically operated means for operating said pendulum.

The objects of my invention further include certain improved mechanical movements of general technical application but of peculiar utility for my present purposes.

The foregoing and such other objects and advantages as may appear or be pointed out as this description proceeds are attained in the form of the device illustrated in the accompanying drawings, in which, Figure 1 is a front elevational view of the device of this invention;

Figure 2 is a vertical sectional view taken on the line 2—2 of Figure 1, looking in the direction indicated by the arrows;

Figure 3 is a fragmentary enlarged elevational view of the detail construction of the one end of the display member support;

Figure 4 is a further fragmentary enlarged elevational view of a part of the device;

Figure 5 is a vertical sectional view of an alternative form of the invention; and Figure 6 is a fragmentary rear elevational view of the device of Figure 5.

Referring more particularly to the drawings, and first to Figures 1 to 4, inclusive, wherein the manually operated form of the device is illustrated, I provide a supporting frame including the sides 5 and 6 and top and bottom walls 7 and 8, the bottom wall 8 being inclined with respect to the other walls for an obvious purpose. The walls 5, 6, 7 and 8 are formed with flanges 5a, 6a, 7a and 8a so that a substantially rectangular supporting frame is afforded, the flanges mentioned bordering the opening through which the display members are viewed. The supporting frame is maintained at an inclination as shown in Figure 2 by the division of the foot piece 9 engageable in suitable sleeves 10 on the walls 5 and 6.

The display apparatus disclosed in Figures 1 to 4 includes a revoluble shaft 11 having the substantially circular plates 12 and 13 fixedly secured thereto near the ends of the shaft, the projecting ends of the shaft being mounted in the suitable bearings 14 and 15 carried by the side walls 5 and 6 at substantially the medial point thereof.

The plates 12 and 13 are provided with suitable bearing openings 16 arranged near the peripheries of said plates in a circular series and said openings 16 serve as bearings for the revoluble shafts 17, the openings in the plates 12 and 13 being in alignment so that said plates and shafts 17 form a substantially cylindrical cage as will be observed from an inspection of Figure 2. The opposite ends of the shafts 17 project from the plates 12 and at one end of the support thus formed each of said shafts receives a helical spring, these springs being designated 18 and having one end anchored in the plate 12 and the other end anchored to the complemental shaft. The other projecting ends 19 of the shafts 16 afford means whereby rotative motion may be imparted to the support.

On each of the shafts 17 there is mounted a frame and as these frames are all substantially alike a description of but one will suffice. The frame referred to is designated 21 and is substantially U-shaped and is provided with sleeves 22 by which the frame is secured on the shaft 17, the frame extending radially from the shaft so that its spaced portions 23 which are complemental channels may receive a plate, card, or other advertising or display member 24, the member being preferably held in the frame by friction. The base portion 21 of the frame is also channeled in shape so as to receive the inner edge of the display member.

It will be observed from the inspection of Figure 2, that the display members and the frames which carry them are radially mounted on the support and as said support is rotated said display members are relatively angularly displaced, in one instance, in the case of the upper member, against the tension of the springs 18, that is, when the outer edge of the display member engages the flange 7a and in the other case the display member released swings downwardly in response to the action of one of the springs 18.

Each of the frames 21 is provided on its side portions 23 with laterally extending fingers 26 which engage stationary abutments 27 secured to the inner sides of the flanges 5a and 6a, the flanges being notched as at 27a to accommodate said fingers as the display members are moved into position. The fingers 26 engage said abutments to hold the exposed display member rigid while being exposed, and to cause a tensioning of the springs 18 as the support starts to revolve, whereupon, when said fingers 26 pass under the abutments the display member will be caused to be displaced rapidly from upper to lower position, and vice versa.

On each display member, that is, on the frame 23 there are provided a pair of spring arms 28, secured to the side members 23 and having curved ends which are adapted to engage and press upon adjacent frames so that when the support carried by the shaft 11 starts to rotate the spring arms 28 will tend to start the first display member downwardly, as soon as the upper edge of the display member has been lowered below the flange 7a. The display member is carried downwardly by the further rotation of the support and under the action of the spring 18 attached to its shaft.

In the case of the display members in the upper position as shown in Figure 2, these members have their upper edges lying against each other due to the action of the springs 18 and in the case of the lower members the same conditions prevail due to the provision of the bar 29.

As the display member support is rotated the display members consecutively move into view at the front and as the rearmost display member is raised by rotation of the support the adjacent spring fingers 28 and the spring 18 serve to swing said member into the upper position. This happens simultaneously with the descent of one of the front members of the display set.

Motion is intermittently imparted to the shaft 11 and the display member support by the provision of a lever 30 fulcrumed at 31 in a bracket 32 fixedly mounted on the flange 6ª, the lower end of said lever having a finger-piece 33 fixedly secured thereto by means of a rod 34, which latter extends through an opening 35 in the flange 6ª.

The upper end of the lever 30 is provided with a pawl 36 which is pivoted at 37 to the lever 30 and under rides the extensions 19 of the shaft 17, said pawl being maintained against said shaft by the provision of a suitable spring 38.

In order to lock the display member support against reversal of movement, a pawl 40 is provided pivoted at 41 in a bracket 42 fixedly secured to the inner surface of the flange 6ª, said pawl having a shoulder 43 which is adapted to engage back of each of the extensions 19 of the shafts 17 as said shafts ride under said shoulder. A spring 44 tends to maintain the pawl in position so that it will lock the display member support in the position to which it has been moved.

In the operation of this form of the device, when pressure is applied to the finger-piece 33 the lever 30 is moved against the tension of a spring 30ª to bring the pawl 36 forwardly under one of the extensions 19 and into engagement therewith. When the finger-piece 33 is released the spring 30ª returns the lever to the position shown in Figure 2 and thus imparts a partial rotation to the display member support displacing the support through an arc of about 45 degrees which presents the opposite side of the top display member as shown in Figure 2 in the same position as that shown for the lower display member in Figure 2, inward motion of the display member when swung down being arrested by the abutments 26. As each movement is imparted to the support for the display members the display members are brought into view consecutively in pairs and as one display member descends in front a complemental display member ascends at the rear, so that the display members, when an even number is provided are disposed equally above and below the horizontal axis of the device.

In the form of the device shown in Figures 5 and 6 the construction of the display devices and the support therefor is substantially identical with that already described in connection with Figures 1 to 4 and therefore a detailed description of this need not be made here. It is sufficient to state that the shaft 11ª is rotatable similarly to the shaft 11 and that the display members 24ª are mounted for angular displacement similarly to the members 24 previously described, the shafts for said members having projections 19ª affording means whereby motion may be imparted to the display member support.

The device of Figures 5 and 6 is automatically operable and the mechanism for actuating the display members includes the oscillating lever 46 pivoted at 47 in a bracket 48 supported by the frame F. A pawl 49 is pivoted at 50 to the lower end of the lever 46 and a spring 51 tends to press said pawl downwardly to cause the shoulder 52 thereof to engage the extensions 19ª. A spring 53 tends to move the lever 46 so that the shoulder 52 will engage one of the extensions 19ª and impart rotation to the display member support.

The lever 46 is moved against the tension of the spring 53 to retract the pawl 49 by the provision of a ratchet wheel 54 rotatable on a shaft 55 which carries a cam 56, said cam having a shoulder forming a high point 57, and the cam riding against a roller 58 carried by the adjacent end of the lever 46. When the roller 58 leaves the high point of the cam the spring 53 will tend to force the lower end of the lever 46 to the left and thus impart movement to the display member support.

Motion is imparted to the ratchet wheel 54 in the direction of the arrow a in Figure 5 by the movement of the pendulum 59 fulcrumed at 60, the upper end of the pendulum having a pawl 61 pivoted thereto at 62 and the lower end of the pendulum being provided with a metallic weight 63, preferably of soft iron to form in effect an armature for the electro-magnet 64. The weight 63 is vertically adjustable on the pendulum by the provision of a nut 65 operating on the lower threaded end of said pendulum. A spring 66 tends to maintain the pawl 61 in engagement with the ratchet wheel 54.

The pendulum serves to actuate and preferably carries means for controlling a circuit C of the electro-magnet 64, and for my present purposes this controlling means comprises a mercury switch 67 including the tubular part arranged at a variable right angle to the pendulum at its fulcrum and mounted in an apertured lug 68 formed on the fulcrum. The terminals of the switch are shown at 69 and are connected to the opposite sides or conductors 70 and 71 of the circuit C, in which latter is interposed any suitable source of electrical energy 72.

The electro-magnet 64 is mounted in a suitable bracket 73 vertically adjustable in guides 74 on the frame F, the bracket 73 having a threaded lug 75 for reception of a bolt 76. The bolt 76 may be rotated in opposite directions by means of a wing-nut 77 secured thereto, said bolt being prevented from vertical displacement by the bracket 78 in which it is mounted.

In the operation of this form of the invention, when the pendulum is in the position shown in Figure 5 the mercury or other metallic fluid in the switch 67 is in the left-hand end of the tube and thus completes the circuit to energize the electro-magnet. When the pendulum swings to the left it is influenced by the electro-magnet attracting the weight 63 which forms an armature for said magnet and just prior to the limit of movement of the pendulum to the left the circuit to the electro-magnet is interrupted by virtue of the metallic contents of the tube 67 flowing to the right-hand end of the tube due to the change in position of the tube in response to movement of the pendulum thus permitting the pendulum to fall away from the electro-magnet and move back to the position shown in Figure 5. This movement is repeated indefinitely as long as the current is supplied to the circuit C and upon each movement of the pendulum an increment of rotation is imparted to the ratchet wheel 54 and cam 57 and at a predetermined time the lever 46 is released from the cam and by the action of the spring 53 rotates the display member support. After each actuation of the lever by the spring 46 the cam, continuing in its intermittent rotation begins to press on the upper end of the lever in preparation of another actuation of the display apparatus. Thus the pendulum, and its associated mechanism form a time controlled device for automatically operating the display apparatus.

Having thus described my invention and illustrated its use, what I claim as new and desire to secure by Letters Patent is:

1. In a display apparatus, in combination, a revoluble support, a plurality of relatively angularly displaceable radial display members carried by said support, and compressible means on one of said display members acting on an adjacent member when released for moving said members to cause such relative angular displacement, and means for imparting movement to said revoluble support whereby to cause such displacement of said display members.

2. In a display apparatus, in combination, a revoluble support, a plurality of relatively angularly displaceable radial display members carried by said support, means on one of said members yieldingly resistantly acting on an adjacent member for causing such angular displacement upon movement of said support, and means for imparting movement to said revoluble support whereby to cause such displacement of said display members.

3. In a display apparatus, in combination, a support, a plurality of angularly displaceable display members carried by said support, means for imparting intermittent movement to the support, and thereby advancing the display members into view, and auxiliary means on each display member for advancing an adjacent display member upon movement of said support.

4. In a display apparatus, in combination, a support, a plurality of relatively angularly displaceable display members carried by the support, means for actuating said support to move the display members into view, and setting means including a cam operatively engaging said actuating means and electromagnetic means for moving said cam.

5. In a display apparatus, in combination, a support, a plurality of angularly displaceable display members carried by said support, an actuating element for moving said support to bring said display members into view, spring means tending to move said actuating element and thereby actuating said support, and means for gradually advancing said actuating element into position against the tension of said spring means and to thereupon release the actuating element for actuating said support by said spring means.

6. In a display apparatus, in combination, a support, a plurality of angularly displaceable display members carried by said support, an actuating element for moving said support to bring said display members into view, spring means tending to move said actuating elements and thereby actuating said support, and electrically controlled means for setting said actuating element against the pressure of said spring means and including a cam acting on said actuating element.

7. In a display apparatus, in combination, a support, a plurality of angularly displaceable display members carried by the support, and means for moving the display members, a cam for actuating said moving means and electrically intermittently operated means for actuating said cam.

8. In a display apparatus, in combination, a support, a plurality of angularly displaceable display members carried by the support, means for moving said support, and electrically operated means including an intermittently actuated cam for actuating the means for moving said support.

9. In a display apparatus, in combination, a support, a plurality of angularly displaceable display members carried by the support, spring pressed means for actuating said support to move the display members into view, and means including a cam having operative engagement with and for setting said actuating means against the pressure of said spring means.

10. In a display apparatus, in combination, a support, a plurality of angularly displaceable display members carried by the support, spring pressed means for actuating said support to move the display members into view, and electrically operated means including a cam having operative engagement with and for setting said actuating means against the pressure of said spring means.

11. In a display apparatus, in combination, a plurality of display members and means for bringing the display members into view, including the pendulum, an electro-magnet for drawing the pendulum to a predetermined position in its movement in one direction, an actuating arm having connection so as to move said display members, spring means tending to hold said arm in a predetermined position and means actuated by said pendulum for moving said arm to an actuating position against the tension of said spring member, and a switch for controlling the energization of the electro-magnet.

12. In a display apparatus, in combination, a revoluble support, a plurality of angularly displaceable display members carried by said support, means for imparting periodical rotation to said support including a revoluble cam, an actuating lever for said support displaced by said cam, and an intermittently actuated electro-magnetic element for imparting motion intermittently in one direction to said cam.

13. In a display apparatus, in combination, a revoluble support, a plurality of angularly displaceable display members carried by said support, means for imparting periodical rotation to said support including a revoluble ratchet wheel and a cam, an actuating lever for said support displaced by said cam, and an intermittently actuated electro-magnetic element for imparting motion intermittently in one direction to said ratchet wheel and cam.

14. In a display apparatus, in combination, a revoluble support, a plurality of relatively angularly displaceable radial display members carried by said support, a retaining member engaging the adjacent edge of one of said display members at rest, means for imparting movement to said revoluble support for displacing said display members, and means on one of said display members for causing angular displacement of an adjacent display member when motion is imparted to said support.

In testimony whereof I have hereunto signed my name.

JOSEPH EIFEL.